United States Patent [19]

Farrow

[11] Patent Number: 4,709,374
[45] Date of Patent: Nov. 24, 1987

[54] TECHNIQUE FOR DECISION-DIRECTED EQUALIZER TRAIN/RETRAIN

[75] Inventor: Cecil W. Farrow, Highlands, N.J.

[73] Assignees: American Telephone and Telegraph Company, New York, N.Y.; AT&T Information Systems Inc., Morristown, N.J.

[21] Appl. No.: 628,147

[22] Filed: Jul. 5, 1984

[51] Int. Cl.⁴ .......................... H03H 7/30; H04B 3/04
[52] U.S. Cl. ...................................... 375/13; 375/15; 375/39; 333/18
[58] Field of Search ....................... 375/11, 12, 13, 14, 375/15, 39; 333/18; 364/724, 825

[56] References Cited

U.S. PATENT DOCUMENTS

| 4,227,152 | 10/1980 | Godard et al. | 375/13 |
| 4,309,770 | 1/1982 | Godard | 375/14 |
| 4,343,841 | 8/1982 | Forney, Jr. | 375/14 |
| 4,344,176 | 8/1982 | Qureshi | 374/15 |
| 4,347,616 | 8/1982 | Murakami | 375/39 |
| 4,355,402 | 10/1982 | Kromer, III et al. | 375/11 |

Primary Examiner—Robert L. Griffin
Assistant Examiner—Andrew J. Telesz, Jr.
Attorney, Agent, or Firm—Ronald D. Slusky

[57] ABSTRACT

An adaptive equalizer for data signals is allowed to start up and train in a wholly decision-directed mode but is precluded from converging to an incorrect state by inhibiting equalizer updating for equalizer output values which fall within a predetermined null zone.

38 Claims, 14 Drawing Figures

○ = TRANSMITTED CONSTELLATION POINTS
● = EQUALIZER OUTPUT CONSTELLATION POINTS

TECHNIQUE FOR DECISION-DIRECTED EQUALIZER TRAIN/RETRAIN

BACKGROUND OF THE INVENTION

The invention relates to adaptive equalizers such as are used in voiceband data sets and other data transmission applications.

Adaptive equalizers for data transmission are typically started up in a so-called ideal reference mode in which a stream of predetermined "ideal reference" values is transmitted to the equalizer over the channel being equalized. The ideal reference data is known a priori at the equalizer and the differences between the equalizer output values, on the one hand, and the known transmitted values, on the other hand, are used by the equalizer as error signals to update its tap coefficients. The latter define the equalizer transfer characteristic, hereinafter also referred to as the equalizer "state". The updating algorithm updates the tap coefficients in such a way as to minimize some function of the error signal—typically its mean-squared value over time. When the equalizer has "converged" to a point at which the mean-squared error is at an absolute, or global, minimum, the equalizer output constellation, i.e., the ensemble of possible equalizer output values, will be substantially congruent with the transmitted constellation, i.e., the ensemble of possible transmitted data symbol values. The channel is then said to be "equalized."

Thereafter, the equalizer operates in response to so-called decision-directed errors in which quantized versions of the equalizer outputs are used in the place of the ideal reference data. The tap coefficients, and thus the equalizer state, are thus continually adapted over time as equalizer operation continues. Advantageously, this allows the equalizer to continually fine-tune its transfer characteristic and thereby compensate, for example, for time-varying effects, such as changes in the communication channel characteristics.

Phenomena such as phase hits and channel switching can result in a subsequent loss of equalization, meaning that the tap coefficients then stored in the equalizer no longer equalize the channel. A new set of tap coefficients which will equalize the channel must then somehow be arrived at, that process being referred to as "re-training." Depending on the level of distortion in the channel, it may be possible to continue to allow the equalizer to simply continue to adapt in a decision-directed mode, starting, for example, with the coefficient values then stored in the equalizer or with some predetermined set of initial values. Disadvantageously, however, it is possible with this approach for the equalizer to converge to an incorrect state in which the decision-directed error function is at a local minimum, rather than being at the above-mentioned absolute, or global, minimum. This results from the fact that, in some equalizer states, the actual and decision-directed errors are different for particular equalizer outputs that represent particular transmitted symbols. The equalizer is thus "stuck" in a stable state in which its output constellation is different from the transmitted constellation and the transmitted data is not correctly recovered.

To avoid this problem, the conventional approach is for a data set whose equalizer needs to be retrained—hereinafter referred to as the "downstream" data set—to transmit a message to the data set at the other end of the channel—hereinafter referred to as the "upstream" data set—requesting the retrain. The ideal reference data is then retransmitted and the equalizer in the downstream data set reconverges to the correct state.

Although generally satisfactory in many applications, this approach has drawbacks. For example, the fact that the downstream data set must communicate its need to be retrained to the upstream data set means that communication of user data from the downstream to the upstream data set, which might well otherwise be able to continue, will have to be interrupted. Moreover, the upstream data set will require some form of detection circuitry to recognize the retrain request, thereby adding to the cost and complexity of the data set.

An additional disadvantage occurs in multipoint networks. In such applications, the need for, say, the (upstream) control data set to transmit ideal reference data over the network for the benefit of a particular (downstream) tributary data set whose equalizer needs to be retrained means that normal communication between the control data set and the other tributary data sets in the network will be interrupted.

It is thus desirable to have a scheme which allows an adaptive equalizer to be trained in a decision-directed mode while eliminating the possibility that it will converge to an incorrect state.

SUMMARY OF THE INVENTION

The present invention is directed to such a scheme. In accordance with the invention, the equalizer is inhibited from updating for at least one equalizer output value whose actual and decision-directed errors differ for at least a particular transmitted symbol, that particular equalizer output thus being more distant in the transmitted constellation from the transmitted symbol than from at least one other point of that constellation. In practical embodiments, equalizer updating is inhibited for a whole range of such equalizer output values falling within a so-called "null zone," the latter including at least one point of the undesired stable constellation but no points of the transmitted constellation.

The invention is illustrated herein in the context of a 16-point quadrature amplitude modulation (QAM) system in which the undesired stable constellation has the same shape and orientation as the transmitted constellation, but is of smaller amplitude. The null zone illustratively lies between the four innermost points and twelve outermost points of the undesired constellation. In a first embodiment, the null zone is in the shape of a square annulus and encompasses the twelve outermost points of the undesired constellation. In a second embodiment, the null zone is in the shape of a circular annulus and encompasses the four outermost points of the undesired constellation.

DETAILED DESCRIPTION

Figure 1:
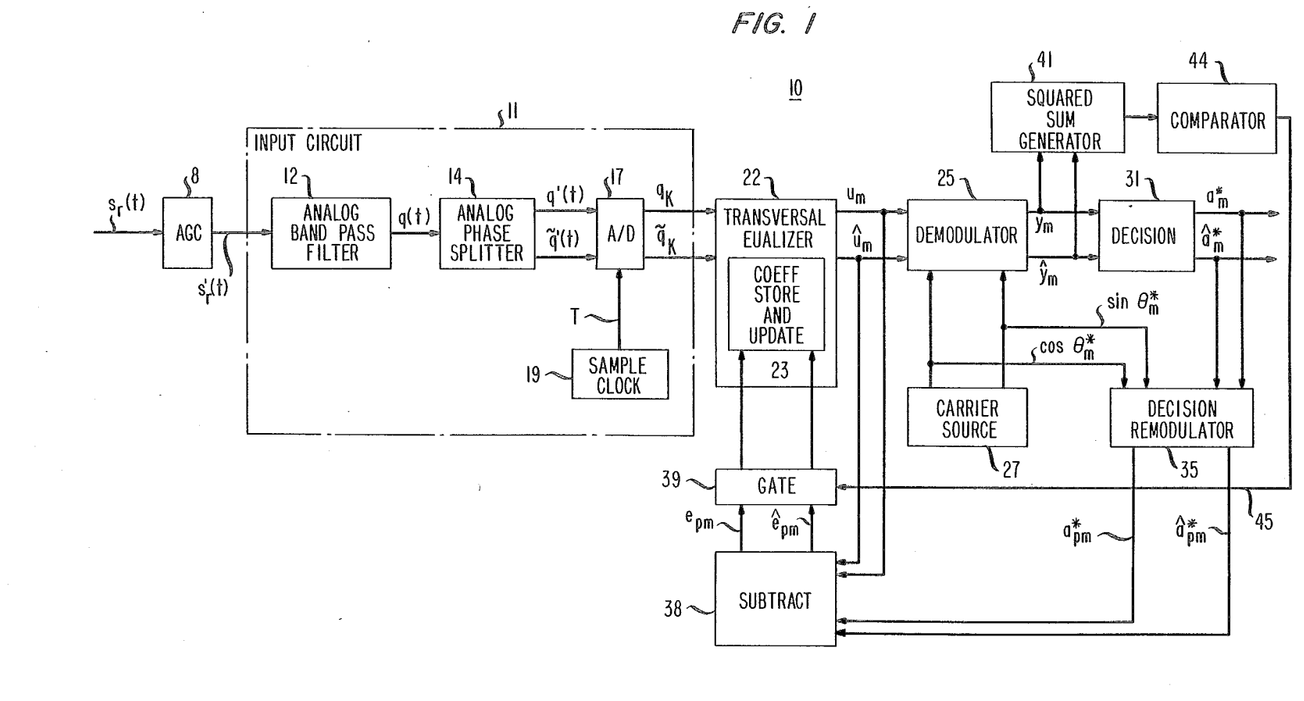
FIG. 1 is a block diagram of a data receiver including circuitry which embodies the principles of the invention.
Figure 2:
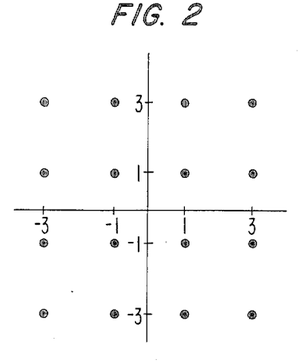
FIG. 2 depicts the constellation of signal points transmitted to the receiver of FIG. 1.

FIG. 1 depicts a receiver 10 for data signals transmitted from a transmitter (not shown) over a bandlimited communication channel, e.g., voiceband telephone circuit. The data signals are illustratively quadrature amplitude modulated (QAM) data signals wherein four information bits, after having been scrambled and differentially encoded in conventional fashion, are transmitted during each of a succession of symbol intervals of duration T. The symbol rate is thus 1/T, yielding a binary transmission rate of 4T/ bits per second. During each symbol interval, the four bits to be transmitted are encoded into two signals, each of which can take on one of the four values [+1, −1, +3, −3]. The two signals transmitted during the $m^{th}$ symbol interval comprise data symbol, or signal point, $A_m$—a complex quantity having real and imaginary components $a_m$ and $\hat{a}_m$, respectively. FIG. 2 depicts the so-called signal constellation of all 16 possible such symbols.

Components $a_m$ and $\hat{a}_m$, in turn, amplitude modulate respective in-phase and quadrature-phase carrier waves, and the combined modulated signals form a QAM signal s(t) of the form $$s(t) = \text{Re} \sum_m A_m g(t - mT) e^{j\omega_c t}$$

where g(t) is a real function and $\omega_c$ is the radian carrier frequency. Signal s(t) is then transmitted to receiver 10.

In receiver 10, the received QAM signal $s_r(t)$ passes through automatic gain control circuit 8 where it emerges as signal $s_r'(t)$. The latter is applied to an input circuit 11 and, more particularly, to analog bandpass filter 12 thereof. The function of filter 12 is to filter out any energy in signal $s_r'(t)$ outside of the transmission band of interest.

Input circuit 11 further includes a phase splitter 14, a sampler in the form of an analog-to-digital (a/d) converter 17 and sample clock 19. Phase splitter 14 responds to the output signal q(t) of filter 12 to generate two versions of signal q(t). One of these is $\bar{q}'(t)$, which may be identical to q(t) or may be a phase-shifted version of it. The other, represented as $q'(t)$, is the Hilbert transform of $\bar{q}'(t)$. Signals $q'(t)$ and $\bar{q}'(t)$ may be regarded as the real and imaginary components of a complex signal Q'(t).

Signals $q'(t)$ and $\bar{q}'(t)$ are passed to a/d converter 17. The latter is operated by clock 19 p times per symbol interval to generate a sampled signal in the form of equalizer input samples $q_k$ and $\bar{q}_k$, k=1,2 ... of signals $q'(t)$ and $\bar{q}'(t)$. (In a typical embodiment, p may take on the value of 2.) Equalizer input samples $q_k$ and $\bar{q}_k$ may be thought of as components of a complex equalizer input sample $Q_k$.

Equalizer input sample components $q_k$ and $\bar{q}_k$ pass on to transversal filter equalizer 22. The latter generates an output once every T seconds. In particular, the output of equalizer 22 during the $m^{th}$ receiver symbol interval of duration T is complex passband equalizer output, or output point, $U_m$ having components $u_m$ and $\hat{u}_m$. Equalizer 22 generates its outputs by forming linear combinations of the equalizer input sample components in accordance with the relations $$u_m = \underline{c}_m^T \underline{r}_m + \underline{d}_m^T \hat{\underline{r}}_m$$

$$\hat{u}_m = \underline{c}_m^T \hat{\underline{r}}_m - \underline{d}_m^T \underline{r}_m$$

In these expressions $r_m$ and $\hat{r}_m$ are (N×1) matrices, or vectors, respectively comprised of the N most recent real and imaginary equalizer input sample components, N being a selected integer. That is $$\underline{r}_m = \begin{bmatrix} q_k \\ q_{k-1} \\ \cdot \\ \cdot \\ \cdot \\ q_{k-(N-1)} \end{bmatrix} \text{ and } \hat{\underline{r}}_m = \begin{bmatrix} \bar{q}_k \\ \bar{q}_{k-1} \\ \cdot \\ \cdot \\ \cdot \\ \bar{q}_{k-(N-1)} \end{bmatrix}$$

In addition, $c_m$ and $d_m$ are (N×1) vectors, each comprised of an ensemble of N tap coefficients having values associated with the $m^{th}$ receiver interval. The values of these coefficients define the transfer characteristic, or "state," of the equalizer. (The superscript "T" used in the above expressions indicates the matrix transpose operation, wherein the (N×1) vectors $c_m$ and $d_m$ are transposed into (1×N) vectors for purposes of matrix multiplication. This superscript should not be confused with the symbol interval T.) The values of the coefficients in these vectors are determined in the manner described below. Vectors $c_m$ and $d_m$ may be thought of as the real and imaginary components of a complex coefficient vector $C_m$.

Passband equalizer output $U_m$ is demodulated by demodulator 25 to yield baseband output, or output point, $Y_m$. The latter and passband equalizer output $U_m$ are associated with, and respectively represent baseband and passband versions of, transmitted symbol $A_m$. Baseband output $Y_m$ has real and imaginary components $y_m$ and $\hat{y}_m$, the demodulation process being expressed as $$y_m = u_m \cos\theta_m^* + \hat{u}_m \sin\theta_m^*$$

$$\hat{y}_m = -u_m \sin\theta_m^* + \hat{u}_m \cos\theta_m^*,$$

$\theta_m^*$ being an estimate of the current carrier phase. For purposes of generating $y_m$ and $\hat{y}_m$ in accordance with the above expressions, demodulator 25 receives representations of $\cos\theta_m^*$ and $\sin\theta_m^*$ from a carrier source 27.

Baseband output $Y_m$ is quantized, or sliced, in decision circuit 31. The resulting output $A_m^*$ is a decision as to the value of the transmitted symbol $A_m$, that decision being the point of the transmitted constellation to which baseband output $Y_m$ is closest. In particular, the real and imaginary parts of $A_m^*$, $a_m^*$ and $\hat{a}_m^*$, are decisions as to the data signal values represented by the real and imaginary components $a_m$ and $\hat{a}_m$ of transmitted symbol $A_m$. Decision circuit 31, more particularly, forms decision $a_m^*$ ($\hat{a}_m^*$) by identifying the one of the four possible data signal values [+1, −1, +3, −3] that is closest to the value of baseband output component $y_m$ ($\hat{y}_m$).

Decision $A_m^*$ is also used to generate an error signal for use in updating coefficient vectors $c_m$ and $d_m$. In particular, decision components $a_m^*$ and $\hat{a}_m^*$ are combined in decision remodulator 35 with $\sin\theta_m^*$ and $\cos\theta_m^*$ from carrier source 27 to form remodulated, or passband, decision $A_{pm}^*$. The real and imaginary components of $A_{pm}{}^*$, $a_{pm}{}^*$ and $\hat{a}_{pm},{}^*$ are formed in accordance with $$a_{pm}{}^* = a_m{}^* \cos \theta_m{}^* - a_m{}^* \sin \theta_m{}^*$$

$$a_{pm}{}^* = a_m{}^* \sin \theta_m{}^* + a_m{}^* \cos \theta_m{}^*.$$

Passband decision $A_{pm}{}^*$ is subtracted from passband equalizer output $U_m$ in subtractor 38 to yield passband error $E_{pm}$ having components $e_{pm}$ and $\hat{e}_{pm}$ given by $$e_{pm} = u_m - a_{pm}{}^*$$

$$\hat{e}_{pm} = \hat{u}_m - \hat{a}_{pm}{}^*.$$

Passband error $E_{pm}$ is referred to as a "decision-directed" error inasmuch as it is generated using decision $A_m{}^*$. The decision-directed error is the same as the actual error as long as the decision $A_m{}^*$ is correct. Otherwise, as discussed in further detail hereinbelow, the actual and decision-directed errors will be different. Error signal components $e_{pm}$ and $\hat{e}_{pm}$ are extended via gate 39—whose function is described in further detail hereinbelow—to coefficient store and update unit 23 within equalizer 22 for purposes of updating the values of the coefficients in coefficient vectors $c_m$ and $d_m$, and thus the state of the equalizer, in preparation for the next, $(m+1)^{st}$, symbol interval. The so-called mean-squared error stochastic updating algorithm—which approximates a true mean-squared error minimization algorithm and which thus minimizes the mean-squared value of the decision-directed errors—is illustratively used, the updating rules being $$\underline{c}_{m+1} = \underline{c}_m - \alpha[\underline{r}_m e_{pm} + \hat{\underline{r}}_m \hat{e}_{pm}]$$

$$\underline{d}_{m+1} = \underline{d}_m - \alpha[\hat{\underline{r}}_m e_{pm} - \underline{r}_m \hat{e}_{pm}],$$

$\alpha$ being a predetermined constant. These rules can be written in complex notation as $$C_{m+1} = C_m - \alpha R_k E_{pm}.$$

The problem to which the invention is directed will now be explained. In this discussion, terms such as equalizer output point and equalizer output constellation are used to mean baseband equalizer output point, baseband equalizer output constellation, etc.

Figure 3:
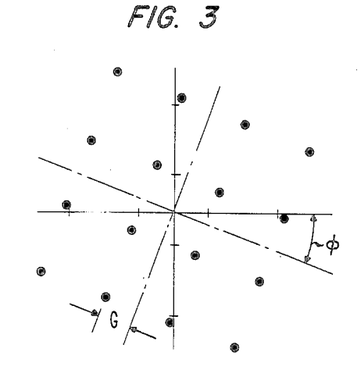
FIG. 3 is a signal constellation helpful in describing the adaptation process within the equalizer of the FIG. 1 receiver.

As shown in FIG. 3, the state of an equalizer can be characterized by a gain $G$ and a rotation $\phi$ which respectively relate the amplitude and orientation of the associated equalizer output constellation—i.e., the set of complex output values generated at the output of demodulator 25 for all possible points of the transmitted constellation—to the transmitted, or ideal, constellation. When the equalizer is in the correct converged state, the values of $G$ and $\phi$ are 1 and 0, respectively, so that the equalizer output constellation is substantially congruent with the transmitted constellation, i.e., the constellation of FIG. 2 in this embodiment.

On the other hand, when an equalizer is in other than the correct converged state—as would occur, for example, during equalizer start-up, after a phase hit or upon an abrupt significant change in channel characteristics—$G$ and $\phi$ will both, in general, have values other than 1 and 0 respectively. Ideally, $G$ and $\phi$ should thereafter ultimately take on the values 1 and 0 as the coefficients continue to update. Unfortunately, however, it is possible for the equalizer to converge to a state in which $G$ and $\phi$ are other than 1 and 0, respectively, and thus in which the output constellation is other than that which is transmitted.

Figure 6:
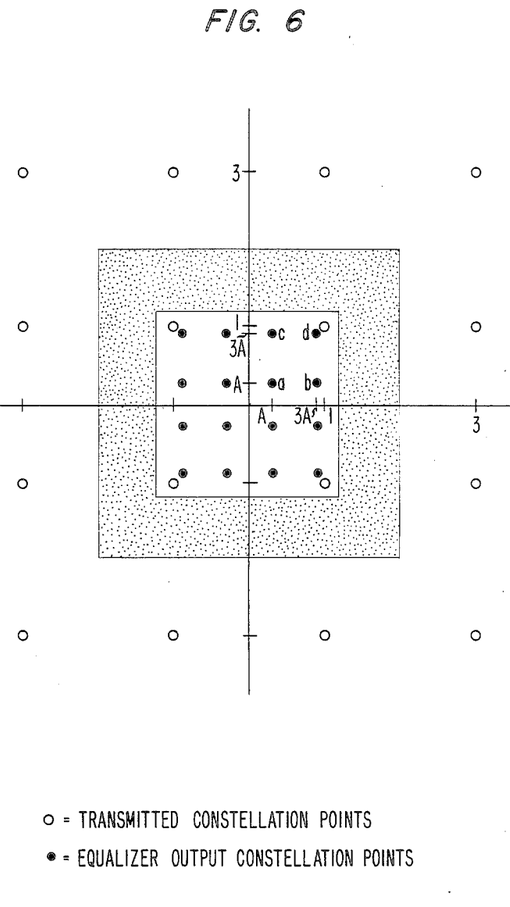
FIGS. 6–10 show further signal constellations helpful in describing the adaptation process.

Assume, for example, that at some point in the process of starting up, the equalizer is in the state whose associated baseband output constellation is as shown in FIG. 6. (Note that the scale of FIG. 6 is expanded from that of FIGS. 2 and 3 for drawing clarity.) The gain $G$ is substantially less than unity. The rotation $\phi$ is assumed to be zero, however, in order to simplify the discussion. Also to simplify the discussion, we will focus attention only on the upper-right quadrant of the constellation the four points of which are labelled a, b, c and d. Inasmuch as the constellation has four-fold symmetry, this can be done without loss of generality.

In particular, note that, although point a is closest in the transmitted constellation to the associated transmitted point which it actually represents, i.e., point (1,1), points b, c and d are more distant from their associated transmitted points—(3,1), (1,3) and (3,3), respectively—than from at least one other point in the transmitted constellation. In particular, they, too, are all closest to the point (1,1). The decision at the output of decision circuit 31 in response to any of these four equalizer output points will thus, in fact, be the point (1,1), i.e., $a_m{}^* = \hat{a}_m{}^* = 1$. Thus the decision-directed error signal generated by subtractor 38 will be generated as a function of the difference between the equalizer output values and the point (1,1)—the error signal actually being the passband version of that difference. In three cases out of four, then, the decision-directed error will be different from the actual error.

Let us now examine what will happen as coefficient updating continues. Assume that the transmitted data is random so that each of the four points a, b, c and d occurs with the same average frequency. The decision-directed mean-squared error (DMSE) can then be computed by simply squaring the distance from the point (1,1) to each of the points a, b, c and d and taking the average. (The term "decision-directed mean-squared error" is used here to denote the fact that the mean-squared error is computed using decisions. The actual mean-squared error is, of course, the averaged squared distance from each of the points a, b, c and d to the points (1,1), (3,1), (1,3) and (3,3), respectively.)

If we take the coordinates of point a to be (A,A), then the coordinates of points b, c and d will necessarily be (3A,A), (A,3A) and (3A,3A), respectively. The DMSE is then given by $$DMSE = \frac{[(1-A)^2 + (1-A)^2] + [(1-A)^2 + (1-3A)^2] + [(1-3A)^2 + (1-A)^2] + [(1-A)^2 + (1-3A)^2]}{4}$$

$$= 10A^2 - 8A + 2$$

Figure 7:
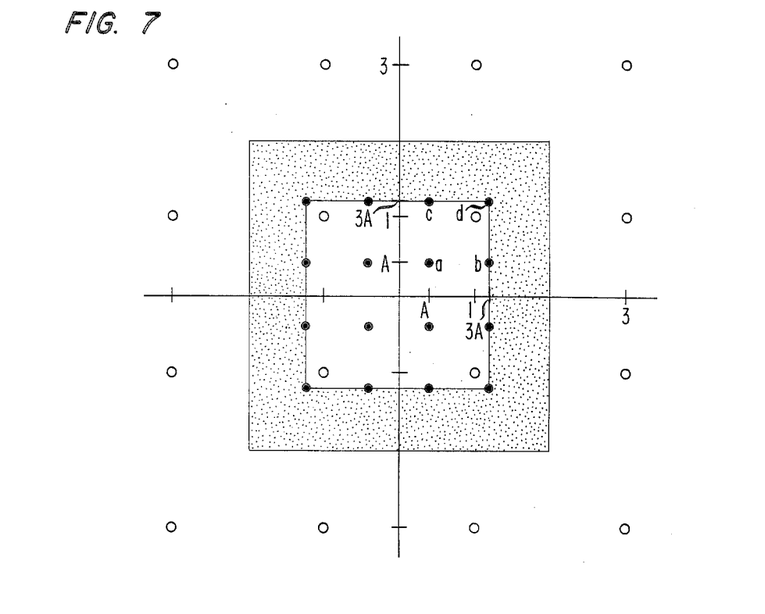

The first derivative of the DMSE, $(20A-8)$, has the value zero at $A=0.4$ and its second derivative, 20, is positive everywhere. The DMSE thus has a minimum at $A=0.4$. Since the coefficient updating algorithm seeks to establish the equalizer in a state in which the mean-squared error is minimized, the equalizer will converge to a state in which $A=0.4$, meaning that each equalizer output component, instead of having one of the values $[+1, -1, +3, -3]$, will have one of the values $[+0.4, -0.4, +1.2, -1.2]$, and the equalizer output constellation is the stable, but incorrect, constellation of FIG. 7. The decisions at the output of decision circuit 31 thus continue to be erroneous indefinitely. The equalizer output constellation for this state is shown in FIG. 7.

Figure 11:
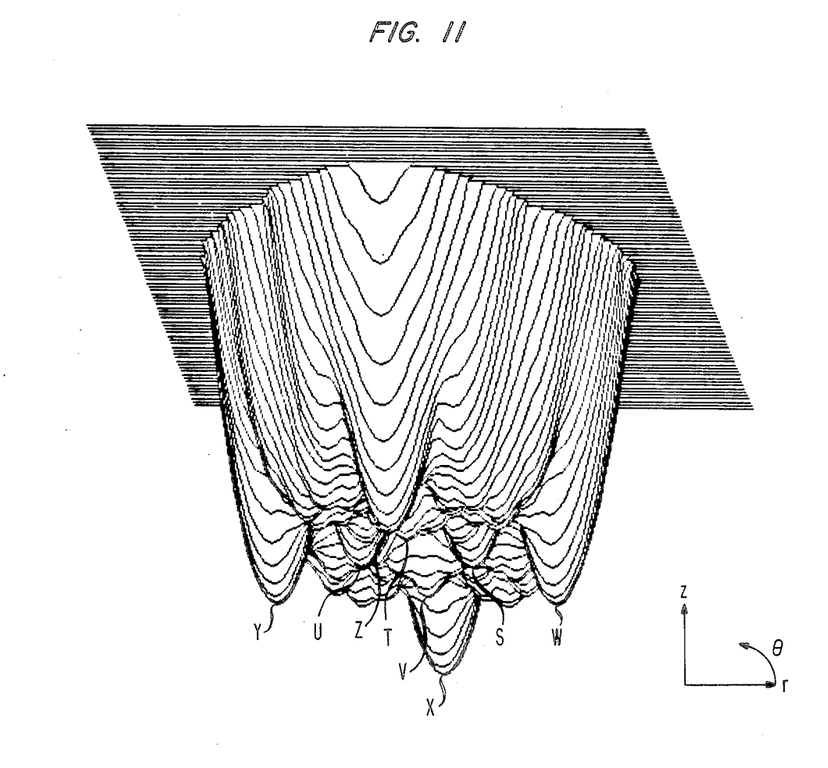
FIGS. 11–14 are decision-directed error surface plots helpful in explaining the principles of the invention.

Considering the problem in a more general context, FIG. 11 is a graph, plotted in cylindrical coordinates, of a so-called decision-directed error surface for the constellation of FIG. 2. This graph plots the value of the decision-directed mean-squared error on the z axis as a function of the equalizer state as represented by the gain G and rotation $\phi$, which are plotted on the r and $\theta$ axes, respectively. A contour version of the plot of FIG. 11 is shown in FIG. 12.

Figure 12:
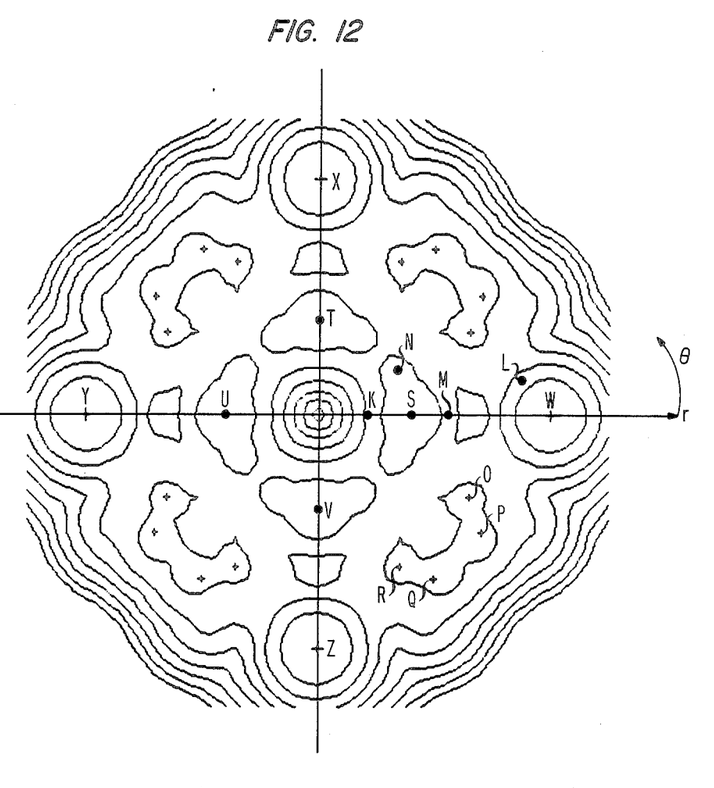

The r and $\theta$ coordinates of, for example, the point labelled W in FIGS. 11 and 12 are 1 and 0, respectively. This point thus represents the correct converged state of the equalizer, as discussed above, and, indeed, is a point at which the decision-directed mean-squared error and, indeed, the actual mean-squared error is at its absolute, or global, minimum. In actuality, since the transmitted data is differentially encoded, a rotation of the equalizer output constellation by any multiple of $\pi/2$ will have no affect on ultimate data recovery. Thus the points labelled W, X, Y and Z are equivalent for purposes here.

In general, the direction in which equalizer state changes as the coefficient updating algorithm continues to minimize the DMSE is the direction of maximum gradient of the DMSE, assuming that the transmitted data symbols occur randomly. This can be thought of as the direction of steepest descent in FIGS. 11 and 12. As long as the equalizer state is in relatively close proximity to a particular one of the points W, X, Y and Z, e.g., point L (shown only in FIG. 10), the direction of maximum gradient is toward that particular point, e.g., toward point W. Thus, the equalizer converges to the correct state.

On the other hand, if the equalizer is sufficiently removed from any of the points W, X, Y and Z, the direction of maximum gradient may be not toward any of the absolute minima at points W, X, Y and Z, but rather toward some other local minimum. This is just the situation discussed above in connection with FIG. 6. If the equalizer is at, for example, point M, for which G$\neq$1 and $\phi$=0, which is exactly the situation depicted in FIG. 6, or, for example, at point N, for which G$\neq$1 and $\phi\neq$0, the direction of maximum gradient is toward point S, at which each of the equalizer output components has one of the values [+0.4, −0.4, +1.2, −1.2] and it is to that point that the equalizer will converge. Again, by symmetry, points T, U and V are equivalent to point S.

As seen from FIGS. 11 and 12, there are other local minima, as well. However, changes in equalizer state are in the direction of maximum gradient only to the extent that the symbols in the transmitted stream are randomly distributed. A sufficiently long sequence of particular transmitted symbols can result in a short-term average DMSE which is quite different from the long-term average DMSE and which moves the equalizer state away from the nearest minimum. Local minima such as those at points O, P, Q and R (and the (unlabelled) corresponding points in the other quadrants) are relatively "shallow" and sequences of symbols that would cause the equalizer to "shake loose" from such points will occur relatively frequently. The existence of such minima does not, therefore, appreciably add to the time required for the equalizer to converge and thus such points pose no particular problem.

On the other hand, the minima at points S, T, U and V are relatively "deep." Thus much longer, and thus less-frequently-occurring, sequences of symbols are required for the equalizer to shake loose from one of those points. Indeed, waiting for such a sequence to occur randomly would inordinately delay the convergence process.

In accordance with the invention, this problem is overcome by inhibiting equalizer updating for particular equalizer output values in such a way that the decision-directed error surface no longer has troublesome minima such as those at points S, T, U and V. This is accomplished by inhibiting equalizer updating for at least one equalizer output value whose actual and decision-directed errors differ for at least a particular transmitted symbol, that particular equalizer output thus being more distant in the transmitted constellation from the transmitted symbol than from at least one other point of that constellation.

In practical embodiments of the invention, equalizer updating is inhibited for a whole range of such equalizer output values falling within a so-called "null zone," the latter including at least one point of the undesired stable constellation but no points of the transmitted constellation. In particular, in a first implementation of the invention in the present illustrative embodiment, the null zone includes the twelve outer points of the undesired stable constellation of FIG. 7, i.e., the points ($\pm$0.4, $\pm$1.2), ($\pm$1.2, $\pm$0.4) and ($\pm$1.2, $\pm$1.2), and extends throughout the range of points one of whose coordinates has a magnitude which is greater than unity—and, as in this embodiment, preferably greater than 1.2—and less than 2, and the other of whose coordinates has a magnitude less than 2. Note that the magnitude of each point in the null zone is greater than the magnitude of each inner point of the transmitted constellation, i.e., the points at ($\pm$1, $\pm$1) but less than the magnitude of each outer point thereof, i.e., the points ($\pm$1, $\pm$3), ($\pm$3, $\pm$1), ($\pm$3, $\pm$3). This null zone is the shaded region in each of FIGS. 6–8.

Let us now return to FIG. 6. As long as the gain G is so small that A<0.4 and points a, b, c and d are all inside the inner boundary of the null zione, as is, in fact, the case in FIG. 6, the equalizer, although adapting toward the undesired local minimum at A=0.4, is also adapting toward the desired minimum at A=1. This corresponds to a movement from, say, point K in FIG. 12 along the $\theta$=0 line toward both points S and W. Once the equalizer reaches the state for which A=0.4, however, points b, c and d fall within the null zone, as shown in FIG. 7. The contributions to the DMSE from those points, which would otherwise tend to "push" the equalizer toward the undesired minimum at point S, are now ignored, in accordance with the invention. The DMSE is then simply given by $$DMSE = [(1 - A)^2 + (1 - A)^2]$$
$$= 2A^2 - 4A + 2.$$

The first derivative of the DMSE is thus (4A−4), which has a minimum at A=1. Thus, even if the errors associated with points b, c and d were never further used for updating, the equalizer would converge, as desired, to a state for which A=1.

Figure 8:
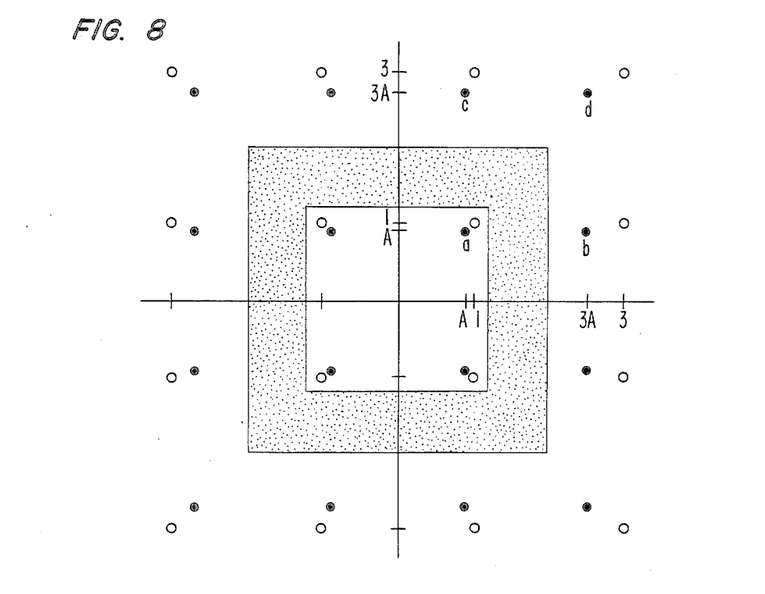

Of course, as can be seen from FIG. 8, once G becomes so large that points b, c and d lie outside of the null zone, their contributions to the DMSE must again be taken into account in computing minima in that function. By now, however, points b, c and d are closer to the points (1,3), (3,1) and (3,3), respectively, than to the point (1,1) and the expression for the DMSE is computed using the distance to each of those points (1,3), (3,1) and (3,3) rather than to the point (1,1). That is, the decision-directed error for each of the points b, c and d is now the same as its actual error. Without showing the calculation here, it suffices to note that the minimum for the DMSE computed this way will still be at A=1, so that the equalizer output constellation becomes substantially congruent with the transmitted constellation.

Figure 4:
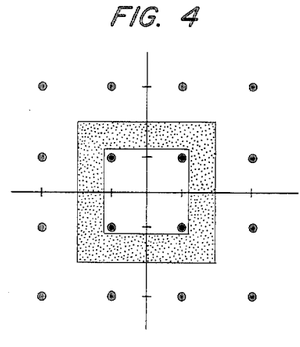
FIGS. 4 and 5 show illustrative null zones in accordance with the invention.
Figure 5:
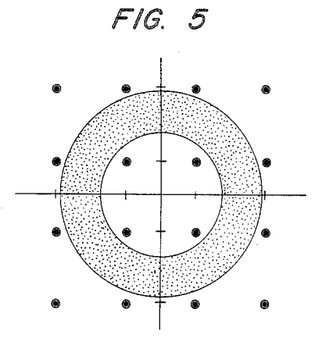
Figure 9:
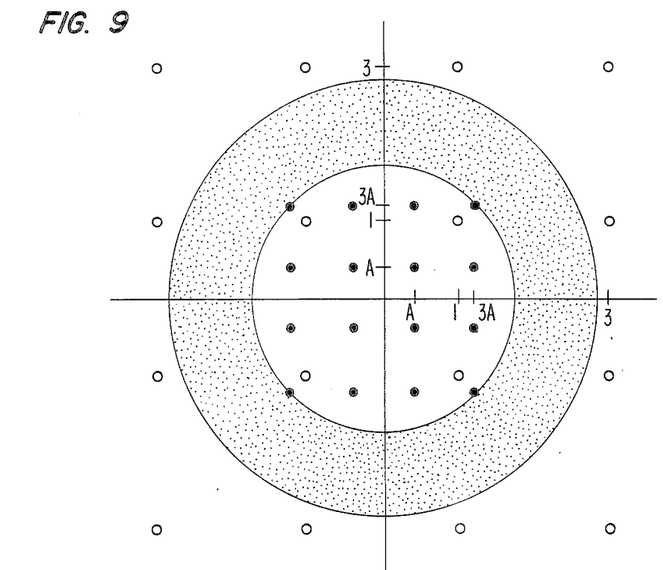

Although the square null zone—which is shown superimposed on the transmitted constellation in FIG. 4—is generally satisfactory, it does allow certain relatively minor local minima to exist in the decision-directed error surface. The equalizer will shake loose from such local minima in short order, as described above. It may be desired, however, to eliminate even such minor local minima. This may be accomplished by using a circular, rather than square, null zone, as shown in FIG. 5. The inner radius of the null zone is at least $\sqrt{2}$, since that is the magnitude of point (1,1). Preferably, as shown in expanded view in FIG. 9, the inner limit of the null zone is the circle passing through the point (1.2, 1.2), i.e., point d of the undesired stable constellation, that point having a radius of about 1.70. The outer limit of the null zone is preferably the circle passing through the point (2,2), which has a radius of $2\sqrt{2} \approx 2.83$.

Figure 10:
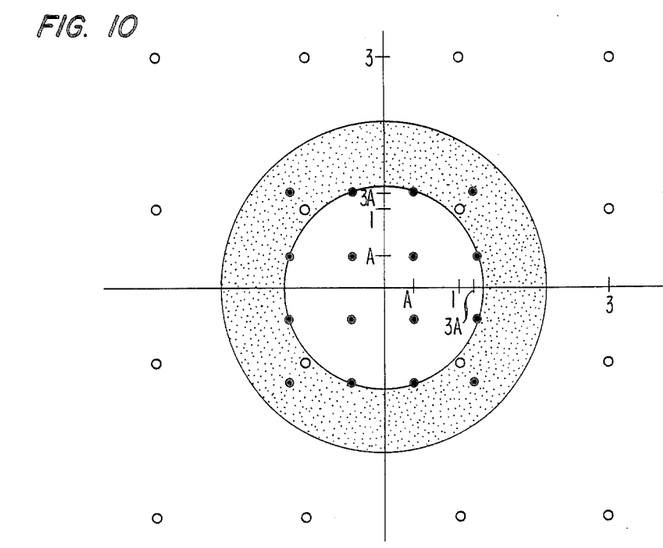

Computing the DMSE without regard to point d (i.e., eliminating the $(1-3A)^2$ terms of the first DMSE equation set forth above and dividing by 3 instead of by 4) yields $$DMSE = [22A^2 - 20A^2 + 6]/3,$$

whose first derivative has a minimum at $A = 5/11 \approx 0.46$. Thus even when the equalizer has reached the point at which poind d is in the null zone, it begins to adapt not toward the state for which A=1, which is the state ultimately desired, but rather to a state having $A \approx 0.46$. The latter is not a stable state, however, because as the equalizer adapts theretoward, its output constellation expands and, as seen in FIG. 10, points b and c enter the null zone at the point where $A \approx 0.38$. Thus, as in the case of the square null zone, the equalizer output constellation continues to expand until it reaches the state for which A=1.

Figure 13:
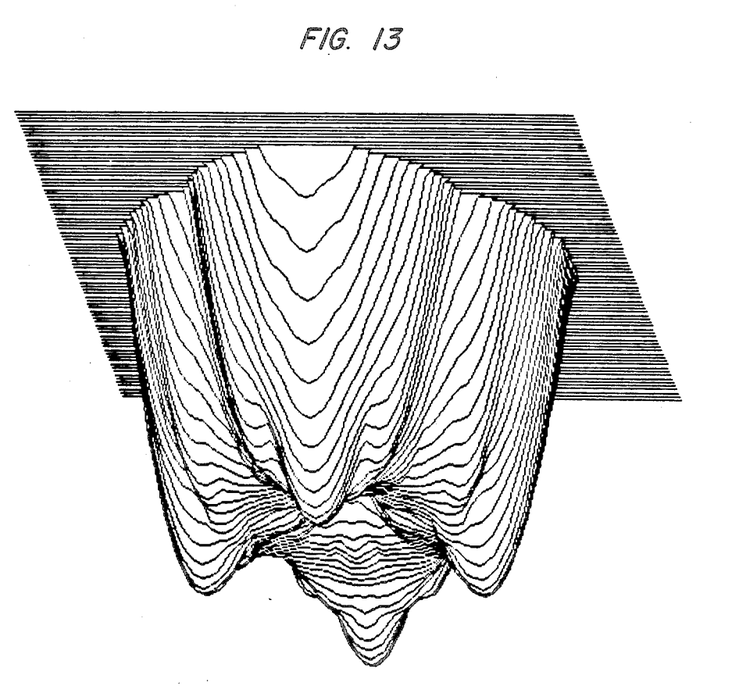
Figure 14:
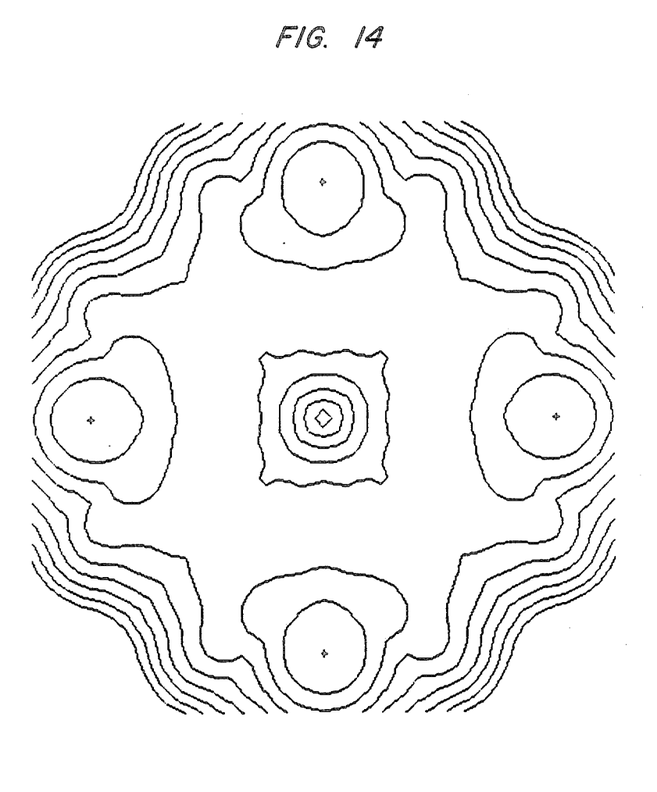

FIGS. 13 and 14 show the decision-directed error surface that results from the use of the null zone of FIG. 5. Note the absence of any significant local minima.

The null zone of FIG. 5 is illustratively the one used in receiver 10 of FIG. 1. In particular, the receiver includes a squared sum generator 41 which responds to equalizer baseband output components $y_m$ and $\hat{y}_m$ to generate the squared magnitude of the current baseband equalizer output, i.e., $|Y_m|^2$. This magnitude is then compared by a comparator 41 to the values $[(1.2)^2 + (1.2)^2] = 2.88$ and $[(2.0)^2 + (2.0)^2] = 8.0$ to see whether $|Y_m|^2$ is within the null zone. (Working with the squared magnitude of $Y_m$ rather than its magnitude per se eliminates the need to compute a square root but is, of course, otherwise equivalent.)

An output bit from comparator 44 on lead 45 indicates whether or not the current equalizer baseband output is within the null zone. This bit controls gate 39. In particular, if the current equalizer baseband output is not within the null zone, the error components from subtractor 38 are simply passed on to coefficient store and update unit 23, as previously described. If, on the other hand, the current equalizer baseband output is within the null zone, gate 39 does not pass the error components through but rather provides error components of zero value. Inasmuch as each equalizer updating term is a multiplicative function of the error component values, this causes the updating term to be zero, thereby effectively inhibiting equalizer updating for the equalizer output in question.

The foregoing merely illustrates the principles of the invention. For example, particular processing steps shown herein as being performed in the analog (digital) domain could be performed in the digital (analog) domain if desired. Moreover, although the invention is illustrated herein in the context of a receiver comprised of a number of discrete functional blocks, a receiver in which the invention is implemented may be comprised, for example, of one or more programmed processors which carry out the functions of those blocks. In addition, the invention is applicable to signal constellations other than QAM or other rectilinear constellations and, indeed, is potentially applicable to virtually any constellation in which the use of a null zone as described herein may be found to be advantageous.

It should also be emphasized that, even in the context of a QAM system such as that described herein, the limits and shape of the null zone may be different from the two null zones shown and described herein.

It will thus be appreciated that, although a specific implementation of the invention is shown and described herein, those skilled in the art will be able to devise numerous alternative embodiments which, although not explicitly shown or described herein, embody the principles of the invention and are thus within its spirit and scope.

What is claimed is:

1. Apparatus for processing a received data signal transmitted to said apparatus over a communication channel, said received data signal representing a succession of transmitted points of a predetermined signal constellation, said apparatus comprising equalizing means having a plurality of states and operative in each of said states for generating in response to said received data signal an equalizer output point associated with each transmitted point, in at least one of said states at least one of said equalizer output points being more distant in said constellation from the associated transmitted point than it is from at least one other point of said constellation and at least another of said equalizer output points being closer in said constellation to the associated transmitted point than it is to any other point of said constellation, means operative in response to each equalizer output point for forming as a decision as to the value of the associated transmitted signal point the point of said constellation to which said each equalizer output point is closest, there being associated with the value of said each equalizer output point and its associated decision a decision-directed error value, means normally operative for updating said equalizing means from its current one of said states to a new one of said states for each of said equalizer output points, said updating being such that the mean-squared value of the decision-directed errors associated with the equalizer output points generated by said equalizing means is minimized, and means for inhibiting the operation of said updating means for at least said one of said equalizer output points while not inhibiting the operation of said updating means for said another of said equalizer output points.

2. The invention of claim 1 wherein said updating means updates said equalizing means utilizing a mean-squared error stochastic updating algorithm.

3. The invention of claim 1 wherein said decision-directed error value is a function of the difference between the value of said each equalizer output point and its said associated decision.

4. The invention of claim 1 wherein each coordinate of at least one of the points of said constellation has one of the values $\pm 1$ and $\pm 3$ and wherein the magnitude of said one of said equalizer output points is greater than $\sqrt{2}$ and less than $2\sqrt{2}$.

5. The invention of claim 1 wherein each coordinate of at least one of the points of said constellation has one of the values of $\pm 1$ and $\pm 3$ and wherein the magnitude of one of the coordinates of said one of said equalizer output points is between unity and 2 and the magnitude of the other coordinate thereof is less than 2.

6. Apparatus for processing a received data signal transmitted to said apparatus over a communication channel, said received data signal representing a succession of transmitted data symbols, said apparatus comprising means for equalizing said received signal to form a succession of equalizer outputs, each equalizer output representing a respective one of the transmitted symbols, means for forming for said each equalizer output an associated decision as to the value of the respective transmitted symbol, there being associated with said each equalizer output a decision-directed error whose value is a function of at least the value of said each equalizer output and the associated decision, and an actual error whose value is a function of at least said each equalizer output value and the value of the respective transmitted symbol, said decision-directed error and said actual error being different from one another when said each equalizer output has at least a first particular equalizer output value while the respective transmitted symbol has at least a first particular data symbol value and said decision-directed error and said actual error being the same when each equalizer output has at least a second particular equalizer output value while the respective transmitted symbol has at least a second particular data symbol value, means normally operative for updating the transfer characteristic of said equalizing means for said each equalizer output as a function at least of the value of the associated decision-directed error, and means for inhibiting the operation of said updating means at least when said each equalizer output has said first particular equalizer output value while not inhibiting the operation of said updating means when said each equalizer output has said second particular equalizer output value.

7. The invention of claim 6 wherein said updating means updates said equalizing means utilizing a mean-squared error stochastic updating algorithm.

8. The invention of claim 6 wherein said updating means updates said equalizing means in such a way that the mean-squared value of the decision-directed errors associated with said equalizer output is minimized.

9. Apparatus for processing a received data signal transmitted to said apparatus over a communication channel, said received data signal representing a succession of transmitted signal points selected from a predetermined constellation, said apparatus comprising equalizing means having a plurality of operating states, each said state having an associated output constellation and an associated error function value, said associated error function value being a measure of the distance between the points of the output constellation associated with said each state and the respective closest points of said predetermined constellation, said function having at least first minimum corresponding to a first one of said states whose associated output constellation is substantially identical to said predetermined constellation and at least a second minimum corresponding to a second one of said states whose associated output constellation is substantially different from said predetermined constellation, said equalizing means being operative in response to said received signal for generating for each different transmitted signal point an equalizer output representing a respective point of the output constellation associated with the current one of said states, means for forming for each said equalizer output an associated decision as to the value of the respective transmitted signal point, means operative for repetitively updating said equalizing means to establish it in a state whose associated error function value is substantially at a minimum point of said function, said updating means including means normally operative for updating said equalizing means to a new state for each said equalizer output, and means for inhibiting the operation of said updating means when the value of said each equalizer output is in a predetermined range of values that includes predetermined ones of the signal points of said output constellation associated with said second state but does not include any of the signal points of said predetermined constellation, while not inhibiting the operation of said updating means when the value of said each equalizer output is outside of said predetermined range.

10. The invention of claim 9 wherein said error function value is the mean squared value of the distance between each point of said associated output constellation and the nearest point of said predetermined constellation.

11. The invention of claim 10 wherein each coordinate of at least one of the points of said predetermined constellation has one of the values $\pm 1$ and $\pm 3$, each coordinate of at least one of the points of said output constellation associated with said second one of said states has one of the values $\pm 0.4$ and $\pm 1.2$, and said range of values includes the values whose coordinates are substantially $(\pm 1.2, \pm 1.2)$.

12. The invention of claim 11 wherein said range of values includes values whose magnitudes are greater than about 1.70 and less than about 2.83.

13. The invention of claim 10 wherein each coordinate of at least one of the points of said predetermined constellation has one of the values $\pm 1$ and $\pm 3$, each coordinate of at least one of the points of said output constellation associated with said second one of said states has one of the values ±0.4 and ±1.2, and said range of values includes the values whose coordinates are substantially (±0.4, ±1.2), (±1.2, ±0.4) and (±1.2, ±1.2).

14. The invention of claim 13 wherein each of at least one of the values in said range has a first coordinate whose magnitude is between 1.2 and 2 and a second coordinate whose magnitude is less than 2.

15. Apparatus for processing a received data signal transmitted to said apparatus over a communication channel, said received data signal representing a succession of transmitted data symbols of a predetermined signal constellation, said apparatus comprising
means for equalizing said received signal to form a succession of equalizer outputs, each equalizer output representing a respective one of the transmitted symbols,
means for forming for said each equalizer output an associated decision as to the value of the respective transmitted symbol,
means normally operative for updating the transfer characteristic of said equalizing means for said each equalizer output as a function at least of the value of said each equalizer output and its associated decision, and
means for inhibiting the operation of said updating means when the value of said each equalizer output is one of a predetermined plurality of values each of whose magnitudes is greater than the magnitude of each of a first plurality of the data symbols of said constellation and less than the magnitude of each of a second plurality of the data symbols of said constellation, while not inhibiting the operation of said updating means when the value of said each equalizer output is other than one of said predetermined plurality of values.

16. The invention of claim 15 wherein said updating means updates said equalizing means utilizing a mean-squared error stochastic updating algorithm.

17. The invention of claim 15 wherein said updating means updates said equalizing means in such a way that the mean-squared value of the difference between each equalizer output and its associated decision is minimized.

18. The invention of claim 15 wherein each coordinate of at least one of the data symbols of said predetermined constellation has one of the values ±1 and ±3 and wherein said magnitudes of said predetermined plurality of values are greater than $\sqrt{2}$ and less than $2\sqrt{2}$.

19. The invention of claim 15 wherein each of the data symbols of said predetermined constellation has a pair of coordinates, wherein each coordinate of at least one of the data symbols of said predetermined constellation has one of the values ±1 and ±3 and wherein the magnitude of one of the coordinates of each of said predetermined plurality of values is between unity and 2 and the magnitude of the other coordinate thereof is less than 2.

20. A method for use in conjunction with apparatus for processing a received data signal transmitted to said apparatus over a communication channel, said received data signal representing a succession of transmitted points of a predetermined signal constellation, said apparatus comprising equalizing means having a plurality of states and operative in each of said states for generating in response to said received data signal an equalizer output point associated with each transmitted point, in at least one of said states at least one of said equalizer output points being more distant in said constellation from the associated transmitted point than it is from at least one other point of said constellation and at least another of said equalizer output points being closer in said constellation to the associated transmitted point than it is to any other point of said constellation;
means operative in response to each equalizer output point for forming as a decision as to the value of the associated transmitted signal point the point of said constellation to which said each equalizer output point is closest, there being associated with the value of said each equalizer output point and its associated decision a decision-directed error value; and means normally operative for updating said equalizing means from its current one of said states to a new one of said states for each of said equalizer output points, said updating being such that the mean-squared value of the decision-directed errors associated with the equalizer output points generated by said equalizing means is minimized; said method comprising the step of
inhibiting the operation of said updating means for at least said one of said equalizer output points while not inhibiting the operation of said updating means for said another of said equalizer output points.

21. The method of claim 20 wherein said updating step is performed utilizing a mean-squared error stochastic updating algorithm.

22. The method of claim 20 wherein said decision-directed error value is a function of the difference between the value of said each equalizer output point and its said associated decision.

23. The method of claim 20 wherein each coordinate of at least one of the points of said constellation has one of the values ±1 and ±3 and wherein the magnitude of said one of said equalizer output points is greater than $\sqrt{2}$ and less than $2\sqrt{2}$.

24. The method of claim 20 wherein each coordinate of at least one of the points of said constellation has one of the values of ±1 and ±3 and wherein the magnitude of one of the coordinates of said one of said equalizer output points is between unity and 2, and the magnitude of the other coordinate thereof is less than 2.

25. A method for processing a received data signal transmitted over a communication channel, said received data signal representing a succession of transmitted data symbols, said method comprising the steps of
equalizing said received signal in accordance with a selected transfer characteristics to form a succession of equalizer outputs, each equalizer output representing a respective one of the transmitted symbols,
forming for said each equalizer output an associated decision as to the value of the respective transmitted symbol, there being associated with said each equalizer output a decision-directed error whose value is a function of at least the value of said each equalizer output and the associated decision, and an actual error whose value is a function of at least said equalizer output value and the value of the respective transmitted symbol, said decision-directed error and said actual error being different from one another when said each equalizer output has at least a first particular equalizer output value while the respective transmitted symbol has at least a first particular data symbol value and said decision-directed error and said actual error being the same when each equalizer output has at least a second particular equalizer output value while the respective transmitted symbol has at least a second particular data symbol value, normally updating said transfer characteristic for said each equalizer output as a function at least of the value of the associated decision-directed error, and inhibiting said updating at least when said each equalizer output has said first particular equalizer output value while not inhibiting the operation of said updating means when said each equalizer output has said second particular equalizer output values.

26. The method of claim 25 wherein said updating is performed utilizing a mean-squared error stochastic updating algorithm.

27. The method of claim 25 wherein said updating is performed in such a way that the mean-squared value of the decision-directed errors associated with said equalizer output is minimized.

28. A method for use in conjunction with apparatus for processing a received data signal transmitted to said apparatus over a communication channel, said received data signal representing a succession of transmitted signal points selected from a predetermined constellation, said apparatus comprising equalizing means having a plurality of operating states, each said state having an associated output constellation and an associated error function value, said associated error function value being a measure of the distance between the points of the output constellation associated with said each state and the respective closest points of said predetermined constellation, said function having at least first minimum corresponding to a first one of said states whose associated output constellation is substantially identical to said predetermined constellation and at least a second minimum corresponding to a second one of said states whose associated output constellation is substantially different from said predetermined constellation, said equalizing means being operative in response to said received signal for generating for each different transmitted signal point an equalizer output representing a respective point of the output constellation associated with the current one of said states; means for forming for each said equalizer output an associated decision as to the value of the respective transmitted signal point; and means operative for repetitively updating said equalizing means to establish it in a state whose associated error function value is substantially at a minimum point of said function, said updating means including means normally operative for updating said equalizing means to a new state for each said equalizer output, said method comprising the step of inhibiting the operation of said updating means when the value of said each equalizer output is in a predetermined range of values that includes predetermined ones of the signal points of said output constellation associated with said second state but does not include any of the signal points of said predetermined constellation, while not inhibiting the operation of said updating means when the value of said each equalizer output is outside of said predetermined range.

29. The method of claim 28 wherein said error function value is the mean-squared value of the distance between each point of said associated output constellation and the nearest point of said predetermined constellation.

30. The method of claim 29 wherein each coordinate of at least one of the points of said predetermined constellation has one of the values $\pm 1$ and $\pm 3$, each coordinate of at least one of the points of said output constellation associated with said second one of said states has one of the values $\pm 0.4$ and $\pm 1.2$, and said range of values includes the values whose coordinates are substantially ($\pm 1.2$, $\pm 1.2$).

31. The method of claim 30 wherein said range of values includes values whose magnitudes are greater than about 1.70 and less than about 2.83.

32. The method of claim 29 wherein each coordinate of at least one of the points of said predetermined constellation has one of the values $\pm 1$ and $\pm 3$, each coordinate of at least one of the points of said output constellation associated with said second one of said states has one of the values $\pm 0.4$ and $\pm 1.2$, and said range of values includes the values whose coordinates are substantially ($\pm 0.4$, $\pm 1.2$), ($\pm 1.2$, $\pm 0.4$) and ($\pm 1.2$, $\pm 1.2$).

33. The method of claim 32 wherein each of at least one of the values in said range has a first coordinate whose magnitude is between 1.2 and 2 and a second coordinate whose magnitude is less than 2.

34. A method for processing a received data signal transmitted over a communication channel, said received data signal representing a succession of transmitted data symbols of a predetermined signal constellation, said method comprising the steps of equalizing said received signal in accordance with a selected transfer characteristic to form a succession of equalizer outputs, each equalizer output representing a respective one of the transmitted symbols, forming for said each equalizer output an associated decision as to the value of the respective transmitted symbol, normally updating said transfer characteristic for said each equalizer output as a function at least of the value of said each equalizer output and its associated decision, and inhibiting said updating step when the value of said each equalizer output is one of a predetermined plurality of values each of whose magnitudes is greater than the magnitude of each of a first plurality of the data symbols of said constellation and less than the magnitude of each of a second plurality of the data symbols of said constellation, while not inhibiting the operation of said updating means when the value of said each equalizer output is other than one of said predetermined plurality of values.

35. The method of claim 34 wherein in said updating step said transfer characteristic is updated utilizing a mean-squared error stochastic updating algorithm.

36. The method of claim 34 wherein in said updating step said transfer characteristic is updated in such a way that the mean-squared value of the difference between each equalizer output and its associated decision is minimized.

37. The method of claim 34 wherein each coordinate of at least one of the data symbols of said predetermined constellation has one of the values $\pm 1$ and $\pm 3$ and wherein said magnitudes of said predetermined plurality of values are greater than $\sqrt{2}$ and less than $2\sqrt{2}$.

38. The method of claim 34 wherein each of the data symbols of said predetermined constellation has a pair of coordinates, wherein each coordinate of at least one of the data symbols of said predetermined constellation has one of the values of $\pm 1$ and $\pm 3$ and wherein the magnitude of one of the coordinates of each of said predetermined plurality of values is between unity and 2 and the magnitude of the other coordinate thereof is less than 2.

* * * * *

UNITED STATES PATENT AND TRADEMARK OFFICE
CERTIFICATE OF CORRECTION

PATENT NO. : 4,709,374

DATED : November 24, 1987

INVENTOR(S) : Cecil W. Farrow

It is certified that error appears in the above-identified patent and that said Letters Patent is hereby corrected as shown below:

Column 3, line 46 "$\tilde{q}'(t)$" should read --$q'(t)$--

Column 3, line 48 "$q'(t)$" should read --$\tilde{q}'(t)$--

Column 3, line 49 "and $q'(t)$" should read --and $\tilde{q}'(t)$--

Column 4, line 4 "$u_m$" should read --$\hat{u}_m$--

Column 4, line 12, second pile, "qk" should read --$\hat{q}_k$--

Column 4, line 13, second pile, "qk-1" should read --$\hat{q}_{k-1}$--

Column 4, line 15, "and $r_m$=" should read --and $\hat{r}_m$=--

Column 4, line 16, " " should read --.--

Column 4, line 17, second pile, "qk-(N-1)" should read --$\hat{q}_{k-(N-1)}$--

Column 5, line 4 "-$a_m$*" should read --$\hat{a}_m^*$--

Column 5, line 5 "$a_{pm}$*" should read --$\hat{a}_{pm}$*--

Column 5, line 5 "+$a_m$*" should read --+$\hat{a}_m$*--

Column 6, line 53 "DMSE=[$(1-3A)^2 + (1-A)^2$] + [$(1-A)^2 + (1-3A)^2$]" should read --DMSE=[$(1-3A)^2 + (1-A)^2$] + [$(1-3A)^2 + (1-3A)^2$]--

Column 8, line 43 "zione" should read --zone--

Column 9, line 40 "poind d" should read --point d--

Column 14, line 50 "characteristics" should read --characteristic--

Column 16, line 11 "and 35 3" should read --$\pm$ 3--

Signed and Sealed this

Ninth Day of May, 1989

Attest:

DONALD J. QUIGG

Attesting Officer

Commissioner of Patents and Trademarks